Jan. 9, 1951      J. C. CLEAVER ET AL      2,537,259
ENGINE DRIVEN VAPOR COMPRESSION STILL
Filed May 7, 1945      3 Sheets-Sheet 1
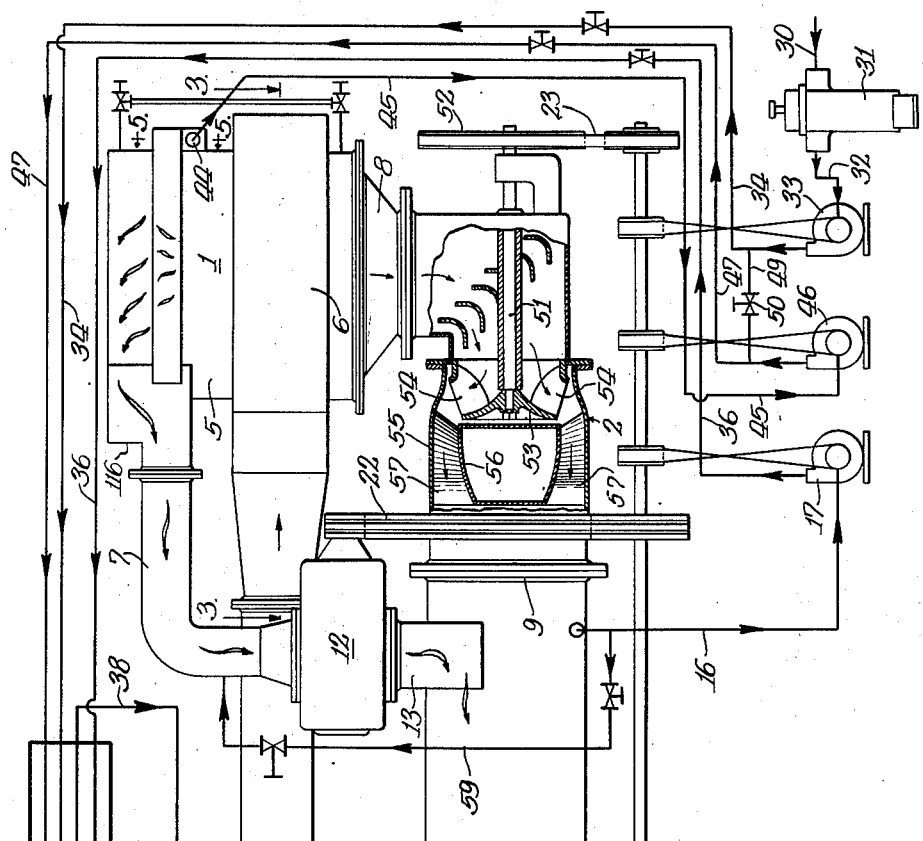

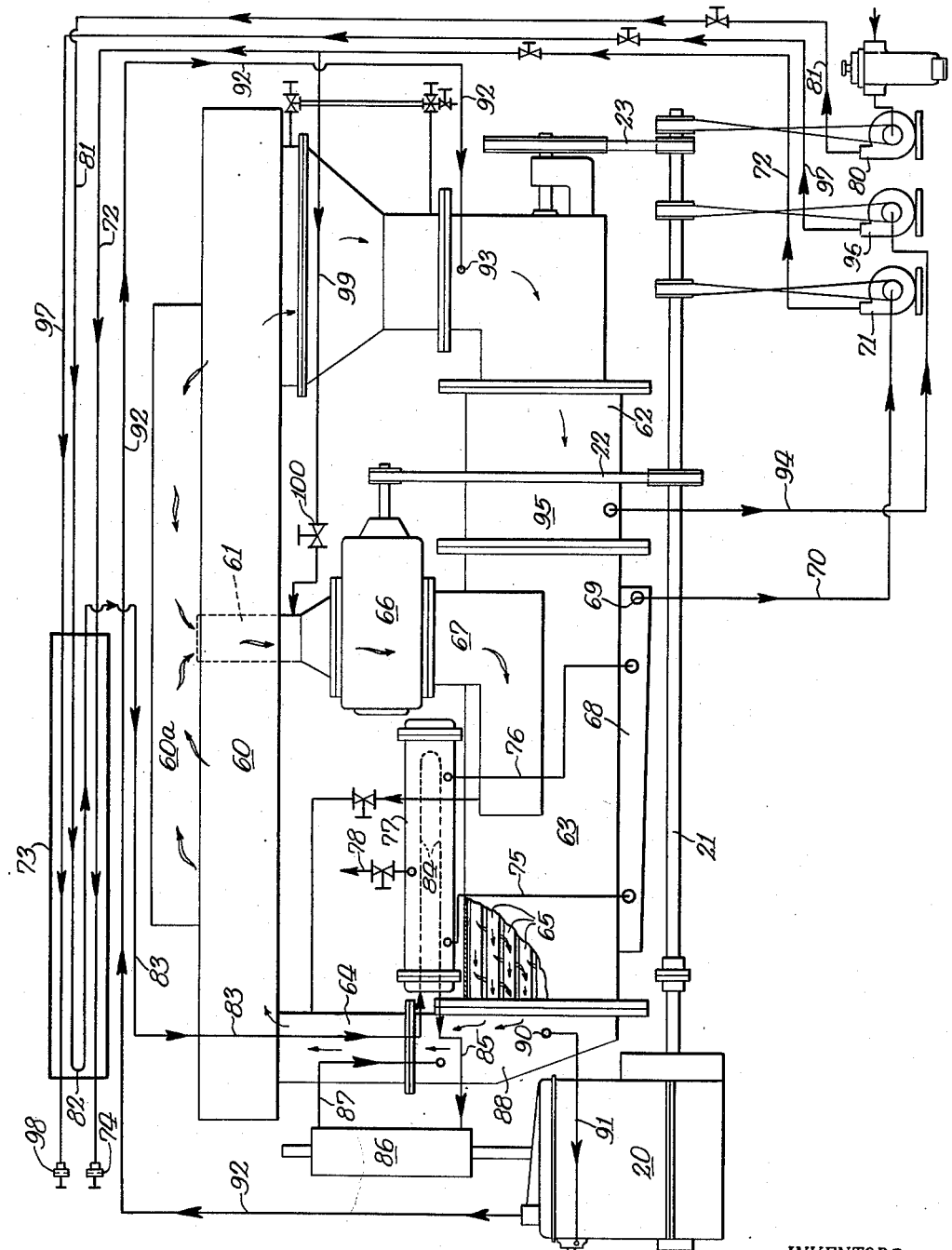

Jan. 9, 1951     J. C. CLEAVER ET AL     2,537,259
ENGINE DRIVEN VAPOR COMPRESSION STILL
Filed May 7, 1945     3 Sheets-Sheet 3
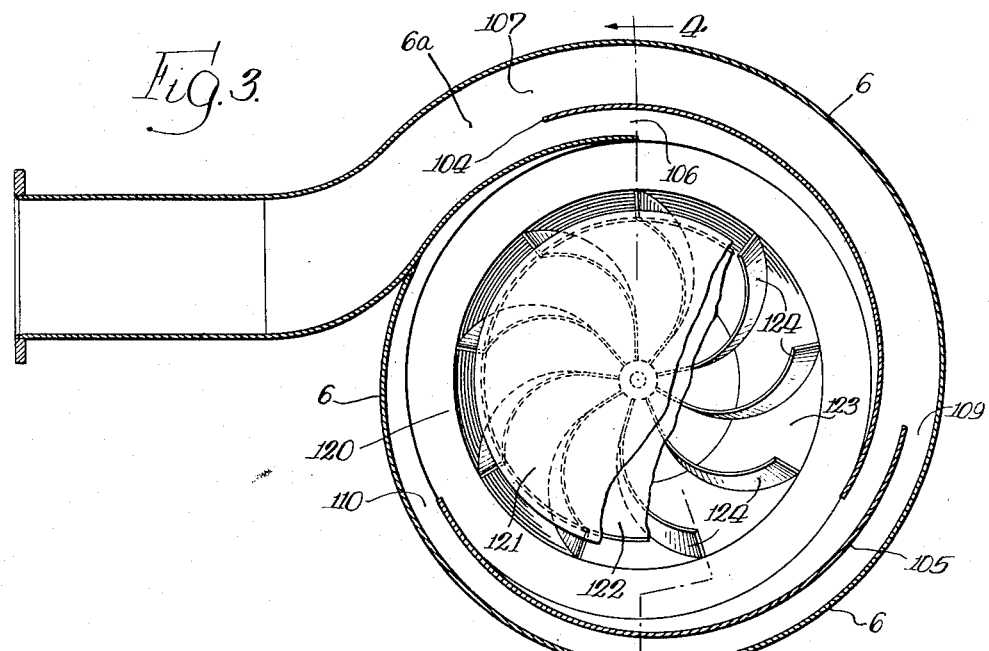
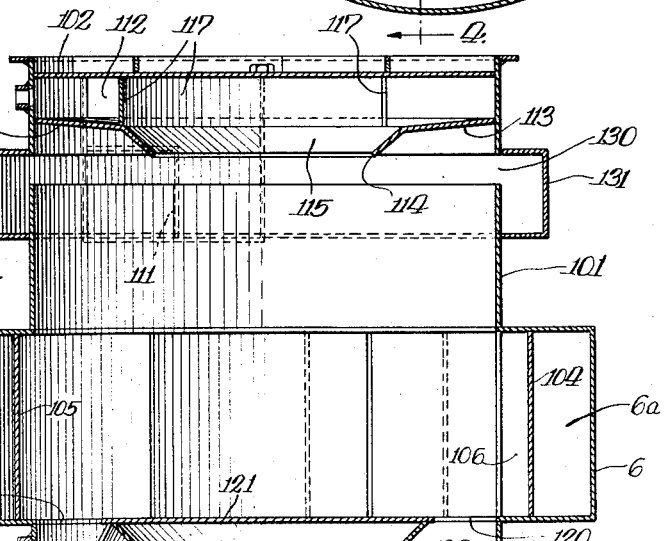
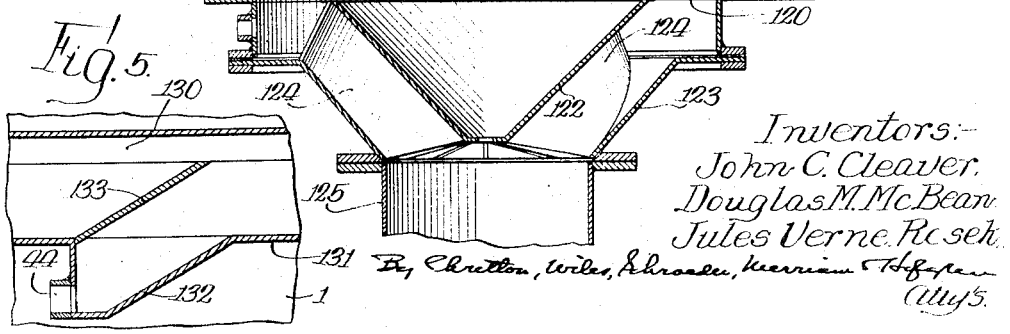
Inventors:
John C. Cleaver,
Douglas M. McBean,
Jules Verne Rosen Patented Jan. 9, 1951

2,537,259

UNITED STATES PATENT OFFICE 2,537,259

ENGINE DRIVEN VAPOR COMPRESSION STILL

John C. Cleaver, Milwaukee, Wis., Douglas M. McBean, Rochester, N. Y., and Jules Verne Resek, Milwaukee, Wis., assignors to Cleaver-Brooks Company, a corporation of Wisconsin Application May 7, 1945, Serial No. 592,514

1 Claim. (Cl. 202—177)

This invention relates to evaporation of a liquid from a solution by the general method of distillation, and it is illustrated herein as embodied in an apparatus particularly designed for the purification of sea water by distillation to secure a product fit for drinking and other purposes. The processes and the apparatus are readily adapted for similar treatment of other liquids and with or without modification are equally adapted for other uses in the art which includes distillation, evaporation, concentration, and the like, all of which include the evaporation of a liquid. In order to simplify the terminology the term "distillation" is hereinafter used to define any one of said methods of treating a liquid.

One object of the invention is to provide a new and improved distillation apparatus and method of operating the same.

Another object of the invention is to provide a method and apparatus for distillation of which a compressor is employed for assisting in the condensation of the distillate and the heating of the raw liquid, and a circulating pump is employed for moving the liquid rapidly through the evaporating apparatus, and an internal combustion engine is utilized for driving the pump and compressor while the sensible heat of the engine is recovered and utilized in the distillation process.

A further object of the invention is to provide a distillation apparatus in which a condenser functions also as an evaporator and a liquid-vapor separator is connected in the circuit with the evaporator and a circulating pump operating to drive heated liquid through the circuit and through the evaporator and separator, together with means for adding heat to the liquid to raise it to the boiling point, said means including a compressor which feeds the vapor released in the separator into out-of-contact heat exchange relation to the liquid in the condenser, whereby the temperature of that liquid is increased and the vapor is condensed for collection of distillate.

The invention also includes the utilization of waste heat to a high degree, as by providing means to transfer heat from the exhaust gas of the engine to the liquid to be treated, transferring heat from the distillate to the liquid to be treated, transferring heat from the concentrated or "blowdown" liquid to the raw liquid to be treated, and also passing a portion of the raw liquid through the circulatory cooling system of the engine for absorbing heat therefrom.

It is also an object of the invention to provide the apparatus in compact close coupled form arranged to be mounted upon a portable base which can be readily moved from place to place, and on which the apparatus will be ready for operation at any time.

Other objects and advantages of the invention will appear from the following description taken in connection with the drawings in which:

Fig. 1 is a diagrammatic view showing in outline and partly in section the essential elements of the apparatus and indicating diagrammatically certain of the conduits and pipe connections between the parts, and also indicating the direction of flow of liquid and vapor through the system.

Fig. 2 is a diagrammatic view similar to Fig. 1, but showing a modification.

Fig. 3 is a horizontal sectional view taken substantially along the line 3—3 of Fig. 1, but with a portion broken away to show parts below it.

Fig. 4 is a vertical sectional view taken substantially along the line 4—4 of Fig. 3.

Fig. 5 is a fragmentary section along the line 5—5 of Fig. 1.

While there is shown in the drawings and described in detail herein certain structure embodying this invention, it is to be understood that the same is not limited to the specific form or application disclosed, and that it is the intention to cover all modifications and alternative constructions falling within the scope of the invention as expressed in the claim.

As shown in Fig. 1, an evaporating apparatus includes a primary circuit consisting of a separator 1, a circulating pump 2, a condenser 3, and a return conduit 4 by which water with entrained steam is conducted from the condenser to the separator. The separator shown in this view is of a special centrifugal design which is the subject matter of a separate application for patent, and is more fully disclosed therein. It may be briefly described as consisting of an upright cylindrical chamber 5 to which the water with entrained steam is conducted through a volute conduit 6 partially encircling the cylindrical wall of the chamber and is discharged tangentially into it so that the water flowing at fairly high velocity is thrown by its own centrifugal force against the inner surface of the chamber 5 and is spread over that surface as it whirls around within the chamber. The water arriving at the separator 1 is preheated about 2½ degrees above its normal boiling point and is under a slightly superatmospheric pressure so that as it is whirled around the cylindrical wall of the separator chamber 5, steam therein is separated from the water and a substantial portion of additional water flashes into steam or vapor almost instantly as the pressure on the water drops and rises to the upper portion of the chamber 5 from which it is conducted through a conduit 7. The temperature of the remaining water is somewhat lowered by the transfer of heat therefrom to the vapor passing to the conduit 7, and this remaining water, gradually losing velocity, travels downwardly through a funnel-shaped outlet 8 which leads to the circulating pump 2. Preferably, the outlet 8 is provided with means such as vanes for arresting the whirling motion of the water and transforming its velocity head into a static head at the pump intake.

The condenser 3 is shown as a horizontally positioned cylindrical shell enclosing a multiplicity of tubes 11 extending from end to end of the shell and supported in tube sheets at 9 and 10 so that the water fed to the condenser by the pump 2 flows directly through these tubes 11. At the same time the vapor flowing from the separator chamber 5 through the conduit 7 is passed through a compressor 12 which feeds the compressed vapor into an inlet 13 entering the side of the condenser shell 3, near one end, whereby the vapor is admitted to the spaces between the tubes 11 within the shell 3. Thus, the vapor released from the liquid in the separator 1 is brought into out-of-contact heat exchange relation with the water which did not vaporize and which is driven through the tubes 11 of the condenser 3 by the pump 2. The resulting heat transfer raises the temperature of the water, and reduces the temperature of the vapor to such a degree that the vapor is largely condensed, releases additional heat to the water, and collects in the lower part of the shell 3. The condensed liquid or distillate is carried away through a pipe 16 leading to the distillate pump 17.

An internal combustion engine is shown at 20 having a shaft 21 suitably coupled to the compressor 12 as by a belt 22 and to the pump 2 as by a belt 23 so that the engine 20 serves as the motive power for driving both the compressor and the pump. The engine is of the liquid cooled type and its circulatory cooling system is coupled into the circuit which includes the condenser and the separator so as to supply heated water thereto. As shown, the condenser 3 is provided with an outlet header 18 to which the conduit 4 is connected, and a pipe 24 taps this header 18 at 25 and leads to the circulating pump 26 of the engine cooling system. The heated water from the engine jacket flows through a pipe 27 which taps into the conduit 4 at 28 so that the water heated by the engine 20 flows to the separator 1 along with the water returned from the condenser 3. In this way the heat losses of the system are constantly made up by heat supplied from the operation of the engine 20.

The raw water or other liquid to be treated by distillation is drawn from a source such as the ocean or a river or a stagnant pool, and enters the system through a pipe 30 in which there may be interposed a strainer 31 of any suitable design and from the strainer a pipe 32 leads to a pump 33 which feeds raw liquid initially through pipe 34 to a heat exchanger 35 herein termed an "after cooler." In the after cooler, which is so named because it performs the final cooling of the distillate, the incoming liquid is brought into out-of-contact heat exchange relation to the distillate which is fed to the after cooler by the pump 17 and by way of a pipe 36. Upon leaving the after cooler the distillate is discharged for use through an outlet valve 37.

The raw water or other liquid to be distilled having been thus preheated by its passage through the after cooler 35, is preferably conducted by a pipe 38 into another heat exchanger, the exhaust gas cooler 40, through which the liquid is passed in out-of-contact heat exchange relation to the exhaust gas of the engine 20, coming from the exhaust pipe 41. The liquid then flows through the pipe 42 to an inlet 43 in the header 18 adjacent its junction with the conduit 4, through which the liquid moves to the separator, along with the liquid from the tubes 11 of the condenser 3.

In order to maintain a proper balance between the raw water or other liquid introduced into the system and the distillate extracted by evaporation, and also to drain away the residual liquid or concentrate, the concentrated liquid may be allowed to overflow or may be continually withdrawn from a chosen point in the primary circuit which includes the separator, circulating pump and condenser. As shown in Fig. 1, a connection for drawing off the concentrated liquid or "blowdown" as it is commonly called in distilling operations, is shown leading from the separator at 44, a pipe 45 extending from this point to a pump 46 having a capacity which is adjusted to maintain the aforesaid balance between the incoming liquid and the distillate, at the same time preventing undue concentration of the recirculated liquid. The blowdown liquid, coming directly from the separator, is at a relatively high temperature, only slightly below the boiling point, and to utilize the heat contained in this liquid the pump 46 operates to feed it by way of a pipe 47 into the after cooler 35 where it passes in out-of-contact heat exchange relation to the incoming raw water in the pipe 34. From the after cooler 35 the blowdown liquid is withdrawn through a suitable valve 48, having given up a measurable quantity of heat to the incoming liquid to assist in raising the temperature thereof in preparation for its distillation.

It may frequently happen that the quantity of liquid which it is necessary to drain off by way of the blowdown pump 46 in order to prevent accumulation of too much liquid in the system, may be greater than the quantity which it would be desirable to drain away to obtain proper concentration of the liquid. To meet this condition, the outlet pipe 47 leading from the pump 46 includes a branch 49 fitted with a control valve 50 and connected into the raw water feed pipe 34. This permits a portion of the blowdown liquid to be mixed with the incoming raw water or other liquid under treatment, and thus passed through the distillation apparatus again, to be further concentrated. Incidentally, of course, this conserves the heat in the blowdown water and assists in raising the temperature of the incoming liquid just as effectively as though the entire output of the pump 46 were fed in out-of-contact relation to the incoming liquid in the after cooler 35.

In Fig. 1 the outer casing of the circulating pump 2 is partly broken away to indicate the general structure of the pump which includes a drive shaft 51 carrying pulley 52 traversed by the drive belt 23. The shaft drives a rotor 53 having suitably formed blades 54 which tend to throw the water outwardly as well as to propel it forwardly and which impart some whirling motion to it. At the discharge end of the pump there is a diffuser structure 55 which includes an outer shell and an inner core 56 spaced from the shell to form an annular passage through which the water flows from the pump rotor. This passage is subdivided by a plurality of vanes 57 which are formed with a slight helical pitch but which terminate in substantially longitudinal portions so as to check the whirling motion of the water and cause it to be efficiently fed into the straight tubes 11 of the condenser 3.

When distillation apparatus of this character is employed for distilling raw sea water, the temperature of the incoming water at the pump 33 may be approximately 56° F. Its passage through the after cooler in heat exchange relation with the distillate (which comes in at about 213.5° F.) and with the blowdown water (which enters the after cooler at about 210° F.) raises the temperature of the raw water to approximately 185° F. As a result of this transfer the temperature of the blowdown is reduced to approximately 87° F. and that of the distillate is reduced to about 78° F. These temperatures will vary within reasonable limits in accordance with operating conditions and the relative quantities of the different liquids, and may be altered also by changes in the design of the after cooler or other parts of the apparatus, and they are cited merely to provide a general idea of the operation of a preferred form of the invention. If desired, the blowdown water at 87° F. (or a portion thereof) may be passed through an oil cooler such as a cooling jacket associated with the oil pan of the engine and connected to the after cooler 35 by pipe 58. After absorbing the heat from the engine oil, this water may be drawn off at 58', or if it is desired to recover the heat the water may be led from the oil cooler back into the blowdown or the raw water line.

The raw water at about 213.5° F. in passing from the after cooler through the exhaust gas cooler 40 is raised to about 215° F. The exhaust gases of the engine are thereby cooled from something over 900° F. down to about 219° F.

As already indicated, the primary source of heat in the apparatus is the internal combustion engine itself. With the arrangement shown in Fig. 1 the water taken from the header 18 at the end of the condenser 3 enters the cooling jacket of the engine at about 214° F., and after absorbing excess heat of the engine, this water flows from the cooling jacket at about 222° F. and is fed back into the conduit 4 leading to the separator.

Usually the vapor enters the compressor 12 somewhat superheated and to absorb the excess heat a portion of the distillate collected in the lower part of the condenser 3 may be returned from the distillate line 16 to the intake conduit 7 of the compressor through a pipe 59.

Fig. 2 illustrates diagrammatically an apparatus embodying the same general principles of operation as that already described, but employing certain units which are slightly different and certain connections involving a variation in arrangement. This system includes a different type of separator which is shown at 60 as a longitudinally extended pan or vessel having a dome or hood 60ª over a substantial portion of its length and having a vapor outlet conduit 61 extending into this hood and opening therein to receive the vapor which collects in this upper space of the separator. This type of separator does not involve the whirling action of the separator shown in Fig. 1, but like the centrifugal separator of the apparatus already described, it is connected directly to a circulating pump 62 which may be similar in structure to the pump shown at 2 in Fig. 1. The pump 62 feeds water from the separator into the condenser 63 and a return conduit 64 leads the water back to the separator 60.

The condenser 63 is generally similar to the condenser 3 already described in that it is provided with a plurality of horizontally extending tubes 65 through which the water is driven by the action of the circulating pump 62. The outlet 61 from the dome 60ª of the separator 60 is connected to a compressor 66 which feeds the vapor into the shell of the condenser 63 by way of a short conduit 67. The vapor flows through the spaces between the tubes 65 and gives up a substantial portion of its heat to the water flowing through the tubes whereby the vapor itself is condensed and collects a distillate in a sump or so-called hot well 68 at the lower portion of the shell of the condenser 63. From an outlet 69 in the hot well a pipe 70 leads to a pump 71 which feeds the distillate through pipe 72 which extends through the after cooler 73 and terminates in a distillate discharge outlet 74. When the distillate formed by condensation in the condenser 63 collects in the hot well there is a quantity of steam released from the surface of the distillate, together with some air entrapped in the steam. Pipes 75 and 76 connect the hot well with a hot well condenser 77 in which the steam is cooled and condensed so that it ultimately flows back to the hot well through the pipes 75 and 76 which are of generous size. The entrapped air is released as the steam condenses and escapes by way of an air vent 78 in the hot well condenser 77.

Raw water or other liquid to be distilled is fed to the apparatus by a pump 80 having a feed pipe 81 which leads into the after cooler 73 and connects with a loop 82 therein by which the liquid is brought into out-of contact heat exchange relation with the distillate flowing through the pipe 72. A return pipe 83 conducts the liquid to a loop or coil 84 in the hot well condenser 77 and it is the out-of-contact heat exchange between the vapor in said condenser and the partially heated water in the coil 84 which serves to condense the vapor as already described. From the hot well condenser 77 the water is fed through a connecting pipe 85 into the exhaust cooler 86 where it is further heated and from which it emerges by way of a pipe 87 which is connected into the header 88 at the outlet end of the condenser from which water is being circulated toward the separator 60.

The cooling system of the engine 20 is connected into the header 88 at 90 by means of pipe 91 leading to the engine jacket so that liquid from the condenser 63 is passed through the engine jacket for absorbing heat therefrom and is pumped from the engine through a pipe 92 which leads to an inlet 93 at the intake side of the circulating pump 62. The heated water thus assists in raising the general temperature of the water being circulated to the separator so that the temperature of the water reaching the separator is slightly above the boiling point (approximating 250° F)., and contains entrained steam. This insures ready separation of steam from the surface of the water in the separator which is facilitated by the suction of the compressor in the vapor collecting dome 60ª.

In this apparatus the excess water in the system is drawn off through a blowdown connection 94 which leads from the diffuser 95 disposed between the circulating pump 62 and the condenser 63. The blowdown liquid is drawn off by means of a pump 96 and the outlet pipe 97, extending from this pump, passes through the after cooler to discharge outlet 98. The relatively high temperature of the blowdown liquid assists in raising the temperature of the raw or incoming liquid flowing through the loop 82 in the after cooler 73. Both the distillate and the blowdown liquid pass through the after cooler in out-of-contact relation to the raw liquid in the loop 82, but this unit is designed for highly efficient heat exchange so that both the temperature of the distillate and that of the blowdown liquid are very substantially reduced while the temperature of the water or other liquid to be distilled is raised to approximately 185° F. in the after cooler alone.

Since the vapor entering the compressor through the conduit 61 may be somewhat superheated, a small quantity of the distillate may be returned from the distillate line 72 by means of a connection 99 controlled by a valve 100 and the distillate being slightly cooler than the superheated vapor serves to absorb the excess heat and will tend to be vaporized as it enters the compressor.

In addition to returning a small quantity of the distillate to the inlet of the compressor for absorbing heat generated in the compressor and preventing superheating of the vapor, a quantity of distillate is also preferably returned to the inlet of the compressor to flush salt or other impurities out of the compressor and prevent scale from accumulating.

As shown in Figs. 1, 3 and 4, the separator 1 includes a chamber having a substantially cylindrical wall 101 with a flat top wall 102, and the liquid from which vapor is to be abstracted is fed into the chamber through the conduit 6 which extends part-way around the cylindrical wall 101 in scroll or volute form. Fig. 3 indicates that the conduit 6 includes a portion 6a which approaches the curvature of the vertical wall 101 and extends into tangential relation thereto. Slightly ahead of the tangent point the conduit 6 is subdivided by a vertical partition 104 so that the liquid passing through the section 6a is divided into two separate streams. The inlet passage is further subdivided by a second partition 105 which starts at a point about 120° around the cylindrical chamber from the starting point of the partition 104 and laps the terminal portion of the partition 104 by a few degrees. The incoming liquid is thus separated into three streams which discharge into the chamber at circumferentially separated points therein for distribution and dispersion of the liquid against the inner wall of the chamber.

The innermost stream enters directly into the chamber at 106, being discharged tangentially against the inner face of the curved partition wall 104 and being distributed and dispersed over the surface of that wall which, as shown, has about 120° of its length exposed toward the interior of the evaporating chamber. The outer stream flowing from the section 6a of the inlet passage into the subdivision between the partition wall 104 and the outer wall of the passage 6 enters between these walls at 107 and flows between them for about 120°, at which point it is divided by the partition 105. The inner portion of the flow is discharged tangentially against the inner face of the partition wall 105. This results in a dispersion of the liquid over a considerable portion of the next 120° of the wall 105. The outermost stream of the liquid enters at 109 into the division of the inlet passage formed between the partition 105 and the outer wall of the passage 6 and flows between these walls for about 120° whereupon it is released at the opening 110 into the interior of the separating chamber and is dispersed tangentially over the adjacent surface of the final portion of said wall of the passage 6 which merges with one wall of the curved portion 6a of the inlet passage, as seen in Fig. 3.

The control of the incoming liquid by the subdivided volute inlet passage causes the liquid to be spread somewhat thinly over the inwardly exposed surfaces of the passage and also over the cylindrical wall 101 of the separating chamber, and if the liquid has been heated to a temperature close to its normal boiling point, or superheated under some pressure to a temperature above its normal boiling point, then, assuming the pressure in the separating chamber is somewhat lower than that at which the liquid has been heated, the release and dispersal of the liquid over the inner surfaces of the chamber will cause a considerable portion of the liquid to flash instantly into vapor form. The purpose of discharging the liquid tangentially against the curved surfaces of the interior of the separating chamber is to expose a maximum volume of the liquid at or near its surface so as to readily release the vapor therefrom. The subdivision of the liquid into several streams released against circumferentially spaced portions of the inner walls, as just described, distributes the thinly spread layer of liquid around the entire circumference of the separating chamber and tends to secure a maximum of separation in a minimum period of time.

The vapor released from the liquid as it whirls around the cylindrical surface of the separating chamber tends to rise in the chamber and is carried off through an outlet conduit 111 leading from a port 112 in the upper portion of the cylindrical side wall 101. Just below the port 112 the chamber is provided with an annular baffle 113 which slopes downwardly toward its central opening 114 and has a more steeply sloping lip portion 115. This baffle serves to limit the dispersion of the liquid upwardly and to prevent the spray from being carried upward and out through the port 112 by entrainment with the vapor. Directly opposite the outlet 112 the conduit 111 has a vertical wall 116 which tends to reduce the velocity of outflow of the vapor, thus minimizing the chance of entrainment of liquid spray therein. Inside the separating chamber a semi-circular baffle 117 extends vertically between the annular baffle 113 and the top wall 102 at a position opposite the outlet 112, also serving to retard the flow of vapor to the outlet so as to cause entrained liquid to be dropped out of the vapor before it leaves the separating chamber.

It is not expected that all the liquid fed to the apparatus through the inlet passage 6 will be vaporized. A portion which remains in liquid form will gradually dissipate its velocity and travel in a descending spiral over the cylindrical wall 101 toward an annular opening 120 which is formed between said wall 101 and a circular bottom plate 121 supported in the lower portion of the separating chamber. Below the plane of the bottom plate 121 and the annular opening 120 a downwardly tapering discharge passage is formed between an inner wall 122 of inverted conical shape and an outer wall 123 of truncated conical form. The funnel shaped discharge passage thus provided is of annular cross section and is fitted with a series of guide vanes 124 distributed at equal angular intervals as seen in Fig. 3. The upper portion of each vane is curved in an approximately spiral form so as to conform approximately to the direction in which the fluid tends to travel downwardly through the outlet passage, but at their lower ends the vanes extend in substantially radial planes so that they shall serve to arrest the whirling motion of the liquid. The liquid discharged through the connecting conduit 125 at the lower end of the tapering outlet of the separating chamber thus becomes a substantially solid stream moving downwardly and providing a static head available for feeding it through direction changing vanes 126 to the pump 2. In the distillation and concentration equipment of Fig. 1 for which this particular separator is especially suited, the pump 2 serves to circulate the liquid through a closed circuit which includes the condenser 3, the pump thus operating to propel the liquid through the circuit and to discharge it forcibly into the separator by way of the tangential volute passages already described.

In a separator of this type in which a superheated liquid is fed tangentially from a volute passage into the separating chamber, the liquid spinning at high velocity in the chamber at once forms a whirlpool having a vortex, and the release of steam or vapor tends to occur with considerable violence which might vibrate and damage the equipment if it were not controlled. But, in the design just described, the sub-division of the inlet passage into a plurality of volutes discharging simultaneously at equally spaced intervals in the circumference of the whirlpool in the separating chamber serves to distribute the mechanical reaction resulting from the sudden release of vapor from the liquid so that the operation is comparatively smooth and without serious vibration. The centrifugal action tends to throw bubbles or droplets of liquid to the periphery of the whirlpool, allowing practically dry steam to pass to the upper portion of the separating chamber and to be carried off through the outlet conduit 111. The centrifugal action also eliminates the tendency of the liquid to foam. In tests of this equipment in which a separator of this type was employed in apparatus for distilling sea water, the distillate has been found to contain salt in the proportion of less than one grain per gallon, indicating a substantially perfect separation of the distilled vapor from the concentrated solution discharged from the lower portion of the separator.

In operating distillation and concentration apparatus, in order to develop its full capacity there may be an excess of liquid fed into the apparatus so that in the centrifugal separator the liquid will rise to a considerable height along the cylindrical wall 101. To control this excess quantity the wall 101 of the separator is interrupted just below the baffle 113 to provide an annular opening 130 which leads into an annular passage or spillway 131 surrounding the separator. The liquid which rises as high as the annular opening 130 will thus be discharged by its centrifugal force into the spillway 131 which serves as a trough through which liquid flows circumferentially and from which it is discharged at 40 and through a downwardly leading outlet 45 (Fig. 1), and to facilitate such discharge an inclined baffle 133 may extend upwardly in the spillway 131 over the outlet 132 as shown in Fig. 5 to intercept the liquid as it flows around the passage 131. The outlet 132 is provided with the pipe coupling 44 for connection by the conduit 45 to the blow-down pump 46.

We claim as our invention:

An apparatus of the character described comprising a separator and a condenser connected in circuit with a pump which forcibly circulates liquid through said separator and condenser, a compressor connected to feed vapor from the separator into the condenser in out-of-contact heat exchange relation to the liquid therein, said condenser including means for collecting distillate formed from said vapor, an internal combustion engine having a liquid cooling circulatory system connected to receive a part of the liquid flowing from the condenser and to discharge heated liquid into said circuit, and a hot well condenser comprising a chamber connected with the distillate collecting means to receive vapor therefrom, said hot well condenser having an air vent for the release of air trapped in said vapor and including a conduit through which liquid to be distilled is passed in out-of-contact heat exchange relation to the vapor in said hot well condenser for condensing said vapor and preheating said liquid, said conduit leading said heated liquid to the separator.

JOHN C. CLEAVER.
DOUGLAS M. McBEAN.
JULES VERNE RESEK.

REFERENCES CITED

The following references are of record in the file of this patent:

UNITED STATES PATENTS

| Number | Name | Date |
|---|---|---|
| 849,579 | Siebel | Apr. 9, 1907 |
| 1,466,670 | Monti | Sept. 4, 1923 |
| 1,966,938 | Stone | July 17, 1934 |
| 2,324,663 | Aiton | July 20, 1943 |
| 2,372,846 | Nettel et al. | Apr. 3, 1945 |
| 2,375,640 | Ford | May 8, 1945 |
| 2,389,064 | Latham | Nov. 13, 1945 |
| 2,389,789 | Latham | Nov. 27, 1945 |

FOREIGN PATENTS

| Number | Country | Date |
|---|---|---|
| 270,471 | Germany | Feb. 17, 1914 |

OTHER REFERENCES

U. S. War Dept. Technical Manual TM 5-2068, page 8, published January 1945 (copy is found in Scientific Library of the U. S. Patent Office).